(12) United States Patent
Feldmann et al.

(10) Patent No.: US 8,872,081 B2
(45) Date of Patent: Oct. 28, 2014

(54) METHODS FOR ADJUSTING A RELATIVE NAVIGATION SYSTEM

(75) Inventors: Michael Steven Feldmann, Rockford, MI (US); Frank Saggio, III, Grand Rapids, MI (US); John Robert Washburn, Rockford, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 475 days.

(21) Appl. No.: 13/286,710

(22) Filed: Nov. 1, 2011

(65) Prior Publication Data

US 2013/0107219 A1    May 2, 2013

(51) Int. Cl.
| | |
|---|---|
| *G05D 1/02* | (2006.01) |
| *G05D 1/08* | (2006.01) |
| *F41G 7/24* | (2006.01) |
| *G05D 1/06* | (2006.01) |
| *G01C 21/24* | (2006.01) |
| *G05D 1/00* | (2006.01) |
| *F41G 7/00* | (2006.01) |

(52) U.S. Cl.
CPC .............. *G01C 21/24* (2013.01); *G05D 1/0684* (2013.01)
USPC ......... 244/3.13; 244/3.1; 244/3.11; 244/3.15; 244/3.16; 701/1; 701/3; 701/4; 701/300; 348/61; 348/135; 348/136; 356/3; 356/20; 356/21; 356/22

(58) Field of Classification Search
CPC ............. G01C 21/24; F41G 7/24; F41G 7/26; F41G 7/263; F42B 15/01; F42B 15/10; G05D 1/08; G05D 1/0808; G05D 1/0825; G05D 1/085; G05D 1/10; G05D 1/101; G05D 1/104; G05D 1/107
USPC .......... 244/3.1–3.3; 701/1, 3, 4, 23, 400, 408, 701/409, 410, 411, 417, 500, 505, 509, 510, 701/300, 302; 382/100, 103, 104, 153; 353/94; 359/1, 15–20; 342/61, 63, 64; 356/3, 20, 21, 22, 601, 614–624; 348/61, 135, 136
See application file for complete search history.

(56) References Cited

U.S. PATENT DOCUMENTS

| | | | | |
|---|---|---|---|---|
| 3,690,594 | A | * | 9/1972 | Menke .......................... 244/3.13 |
| 4,174,818 | A | * | 11/1979 | Glenn .......................... 244/3.13 |
| 4,232,313 | A | * | 11/1980 | Fleishman .................... 701/300 |
| 4,243,187 | A | * | 1/1981 | Esker ........................... 244/3.13 |
| 4,299,360 | A | * | 11/1981 | Layton ......................... 244/3.13 |

(Continued)

OTHER PUBLICATIONS

Sungsik Huh, David Hyunchul Shim, A Vision-Based Automatic Landing Method for Fixed-Wing UAVs, J Intell Robot Syst, 2010, Department of Aerospace Engineering, KAIST, Daejeon, South Korea.

(Continued)

*Primary Examiner* — Bernarr Gregory
(74) *Attorney, Agent, or Firm* — GE Global Patent Operation; Mark A. Conklin

(57) ABSTRACT

A relative navigation system projects a grid into space from a grid generator and an object, such as an unmanned aerial vehicle, may use the projected grid to aid in the landing of the object. Methods of adjusting the projected grid including stabilizing the projected grid and orienting the grid generator relative to the earth.

15 Claims, 7 Drawing Sheets

(56) References Cited

U.S. PATENT DOCUMENTS

| | | | | |
|---|---|---|---|---|
| 4,406,430 | A * | 9/1983 | Krammer et al. | 244/3.13 |
| 4,441,669 | A * | 4/1984 | Wich | 244/3.13 |
| 4,490,719 | A * | 12/1984 | Botwin et al. | 342/64 |
| 4,709,875 | A * | 12/1987 | Cremosnik et al. | 244/3.13 |
| 5,056,736 | A * | 10/1991 | Barton | 244/3.13 |
| 5,082,201 | A * | 1/1992 | Le Bars et al. | 244/3.16 |
| 5,155,775 | A * | 10/1992 | Brown | 382/153 |
| 5,344,099 | A * | 9/1994 | Pittman et al. | 244/3.13 |
| 5,379,966 | A * | 1/1995 | Simeone et al. | 244/3.11 |
| 5,427,328 | A * | 6/1995 | Tong et al. | 244/3.13 |
| 5,533,692 | A * | 7/1996 | Layton | 244/3.13 |
| 7,418,343 | B1 * | 8/2008 | McGraw et al. | 701/300 |
| 7,681,839 | B2 | 3/2010 | Mickley et al. | |
| 8,019,538 | B2 * | 9/2011 | Soehren et al. | 701/510 |
| 8,244,455 | B2 * | 8/2012 | Case et al. | 701/417 |
| 8,311,695 | B2 * | 11/2012 | McKitterick | 701/23 |
| 8,326,523 | B2 * | 12/2012 | Stimac et al. | 701/300 |
| 8,352,100 | B2 * | 1/2013 | Stimac et al. | 701/4 |
| 8,386,096 | B2 * | 2/2013 | Stimac et al. | 701/4 |
| 2005/0052718 | A1 * | 3/2005 | De Shon | 359/15 |
| 2008/0297740 | A1 * | 12/2008 | Huynh et al. | 353/94 |
| 2009/0306840 | A1 | 12/2009 | Blenkhorn et al. | |
| 2009/0326736 | A1 * | 12/2009 | Waid | 701/3 |
| 2010/0202031 | A1 | 8/2010 | Feinsod et al. | |
| 2010/0292873 | A1 | 11/2010 | Duggan et al. | |
| 2010/0292874 | A1 | 11/2010 | Duggan et al. | |
| 2011/0153205 | A1 | 6/2011 | Stimac et al. | |

OTHER PUBLICATIONS

Giulio Avanzini, Guido De Matteis, Design of a Shipboard Recovery System for a Shrouded-Fan UAV, Turin Polytechnic, Dept. of Aeronautical and Space Engineering, University of Rome "La Sapienza", Dept. of Mechanics and Aeronautics, IAS 2002 Congress.

* cited by examiner

METHODS FOR ADJUSTING A RELATIVE NAVIGATION SYSTEM

BACKGROUND OF THE INVENTION

Unmanned aerial vehicles (UAVs) are aircraft that fly without onboard pilots. They rely on complete or partial automation for control during their takeoff, flight, and landing. UAVs have become increasingly popular but the logistical complexity of UAV control makes their use burdensome. UAV landings are typically done at locations having traditional landing aids such as Instrument Landing Systems (ILS), Very High Frequency Omnibearing Receivers (VOR), Distance Measuring Equipment (DME) Microware Landing Systems (MLS), RADAR, etc., which aid the remote pilot in landing the aircraft and/or provide for automated landings. However, it is often desirable to launch and land UAVs at locations where the infrastructure for traditional landing aids is not available, which limits the flexibility of the UAV. Additionally, landing aids that emit radio frequency energy have the further disadvantage of being easily targeted. The landing problem is exacerbated when the UAV is being landed on a moving structure, such as a ship, vehicle, or aircraft, because the existing landing aids are intended to be used on stationary structures and do not compensate for movement of the vehicle or structure on which the UAV is landing.

BRIEF DESCRIPTION OF THE INVENTION

In one embodiment, a method of stabilizing a grid projected from a grid generator includes repeatedly projecting into space from the grid generator a plurality of lines defining a grid, with the lines encoded with grid data configured to identify predetermined points on the grid, determining a change in the reference frame of the grid generator relative to prior grid projection, and altering the grid data of a subsequent grid projection such that the subsequent grid projection appears stabilized relative to a prior grid projection.

In another embodiment, a method of orienting relative to earth a grid generator for a relative navigation system includes leveling the grid generator, determining a heading of the grid generator relative to a reference direction, and projecting from the grid generator a plurality of lines defining a grid along a predetermined heading.

DESCRIPTION OF EMBODIMENTS OF THE INVENTION

Figure 1:
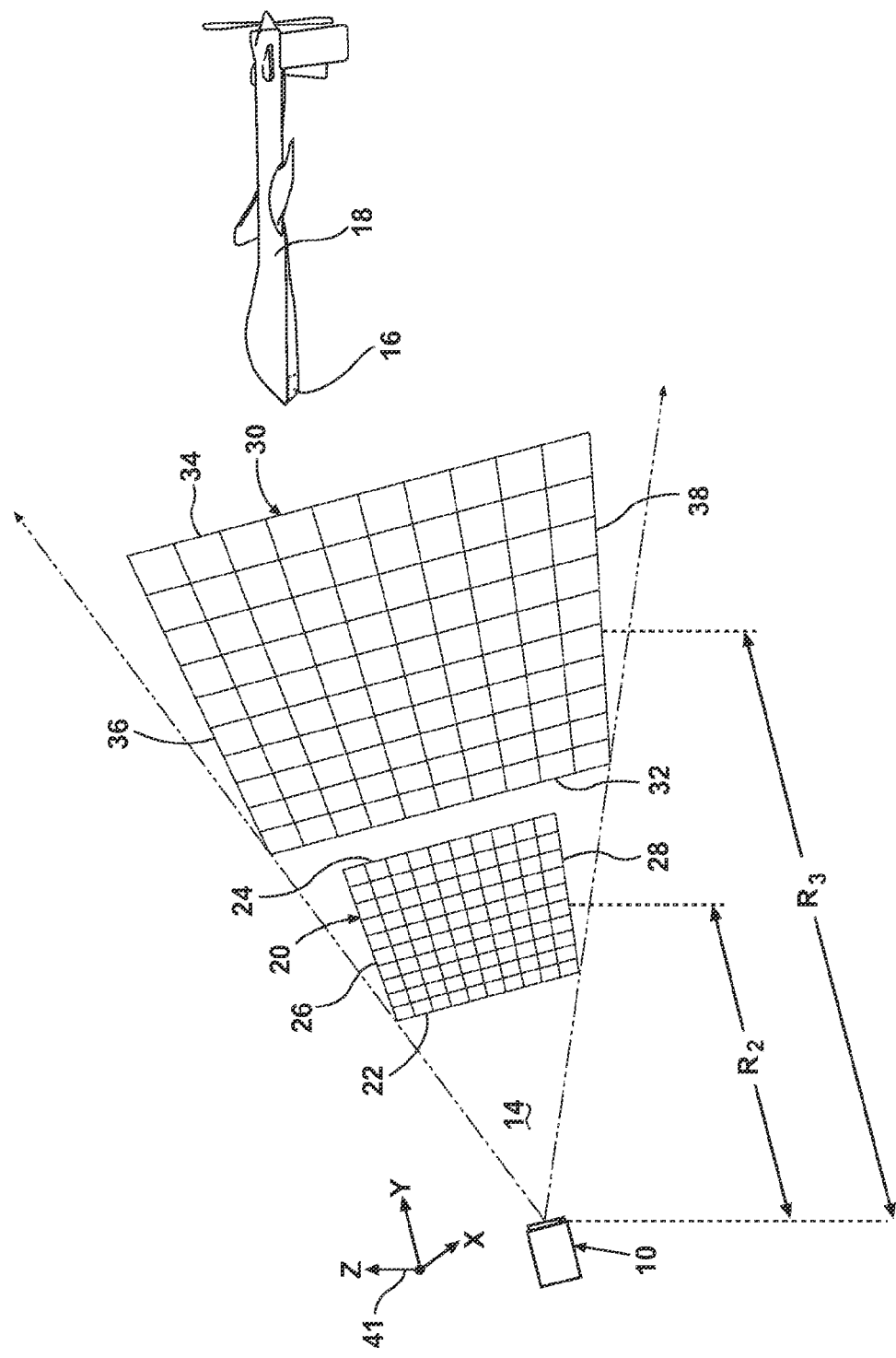
FIG. 1 is a perspective view of a UAV and a grid generator according to an embodiment of the invention.

The embodiments of the present invention are related to methods and apparatus for adjusting a projected grid from a grid generator of a relative navigation system, which may be used for landing any type of aircraft and is particularly well suited for landing UAVs. FIG. 1 illustrates an embodiment of a grid generator 10 may project a grid 12, such as a plurality of intersecting lines, into space within a field of transmission 14. The general details of how to project the grid 12 are known in the art, which include the disclosure in U.S. Pat. No. 7,681,839, issued Mar. 23, 2010, entitled Optical Tracking System For Refueling, and US 2011/0153205, published Jun. 23, 2011, entitled Relative Navigation System, both of which are incorporated by reference. Therefore, the general details of the grid generation will not be fully described in this application.

As illustrated, the projected grid comprises intersecting lines. At some distance away from the grid generator 10, these intersecting lines are observed as a grid in space, with the size of the grid increasing away from the grid generator 10. The grid in space generated by the grid generator 10 may be detected by a detector module 16 of a moveable object, which may then maneuver itself based upon the detected grid. For purposes of this discussion the moveable object will be described as a UAV 18 having the detector module 16. For relative navigation between the grid generator 10 and the UAV 18 it is presumed that detector module 16 of the UAV 18 lies within the field of transmission of the grid generator 10, enabling the detector module 16 to "see" the grid.

For description purposes, the grid generator 10 may be thought of as projecting intersecting lines substantially in the y direction of the coordinate system. If one were to observe the projection of intersecting lines in the x-z plane at some distance $R_2$ away from the grid generator 10, one would observe a first grid 20. If one were to observe the same projection of intersecting lines at a distance $R_3$, which is greater than the first distance $R_2$ in the x-z plane, one would observe a second grid 30, which appears relatively larger than the first grid 20.

The first grid 20 at distance $R_2$ away from the grid generator 10 is spatially bound in the horizontal direction by a first vertical line 22 and a second vertical line 24. There exists a plurality of vertical lines spatially and temporally generated in between the first vertical line 22 and the second vertical line 24. The first grid 20 at a distance $R_2$ away from the grid generator 10 is spatially bound in the vertical direction by a first horizontal line 26 and a second horizontal line 28. There exists a plurality of horizontal lines spatially and temporally generated in between the first horizontal line 26 and the second horizontal line 28. The distance $R_2$ can be any distance between the grid 20 and the grid generator 10.

The second grid 30 at distance $R_3$ away from the grid generator 10 is for all practical purposes the same as the first grid 20, but at further distance from the grid generator 10 than the first grid 20. The grid 30 is spatially bound in the horizontal direction by a first vertical line 32 of the second grid 30 and a second vertical line 34 of the second grid 30. There exists a plurality of vertical lines spatially and temporally generated in between the first vertical line 32 of the second grid and the second vertical line 34 of the second grid. The second grid 30 at a distance $R_3$ away from the grid generator 10 is spatially bound in the vertical direction by a first horizontal line 36 of the second grid 30 and a second horizontal line 38 of the second grid 30. There exists a plurality of horizontal lines spatially and temporally generated in between the first horizontal line 36 of the second grid and the second horizontal line 38 of the second grid.

The similarity of the grids 20 and 30 becomes apparent in the case of projected grid lines, where the grid 30 is formed by the same lines forming the grid 20, except that the grid 30 is observed at a further distance from grid generator 10, making the grid 30 appear larger than the grid 20. In this sense, the grid 30 is the appearance of the grid lines generated by the grid generator at the distance $R_3$ whereas the grid 20 is the appearance of the grid lines at the distance $R_2$.

The grids 20 and 30 may be of any number of lines. As illustrated, they are comprised of ten vertical lines by ten horizontal lines. A grid comprised of a greater number of intersecting lines may result in improved detection for a fixed field of transmission 14 and distance from the detector module 16 than a grid comprised of a fewer number of intersecting lines. The grids 20 and 30 are depicted as a square shape, but this is not a requirement. The grid can be any shape including rectangular, oval, or circular. Furthermore, the intersecting lines of the grids 20 and 30 are depicted as orthogonal; however, this is not a requirement. The angles between the intersecting lines may be right angles, acute angles, or obtuse angles in different parts of the grid.

The vertical and horizontal lines may be formed in any suitable manner by the grid generator 10. For example, all of the lines may be formed sequentially or all at once. Either one of the vertical lines or horizontal lines may be formed before the other. The grid generator may alternate between vertical and horizontal lines. When the grid generator 10 uses a scanning laser to form the grid, the laser will sequentially form all of one of the vertical and horizontal lines, followed by the sequential forming of the other of the vertical and horizontal lines. The rate at which the lines are sequentially formed may be so fast that for practical purposes, it is as if all of the grid lines were simultaneously formed. The radiation source for the plurality of projected lines may be a coherent or incoherent radiation source. For example, when the radiation source is a coherent source, it may be a solid state laser that emits radiation at a wavelength in the near-UV range. Additionally, the radiation frequency and/or intensity may be selected, or attenuated by use of an optical filter, to reduce the risk of eye damage. The grid of intersecting projected lines may be generated by raster scanning each of the lines or by projecting and scanning an elongated radiation beam. Any suitable methods and apparatus for generating the intersecting lines may be used.

Although, examples shown use Cartesian coordinates, any appropriate coordinate system may be used including polar, cylindrical, or spherical coordinate systems for both grid generation and for grid detection. For example, to form a grid amenable to polar coordinate representation, a series of concentric circles and lines radiating out from the center of those circles may be projected by the grid generator into space.

Grid data may be encoded at one or more locations of the grid. By grid data, it is meant that the structure or characteristic of the grid provides data or information that may be read or detected by the detector module 16. In one embodiment, the projected lines comprising the series of projected intersecting lines are further encoded with different grid data in different regions of the grid to indicate regions within the grid of intersecting lines. One manner of encoding of the grid data is by modulating the beam in the case of a laser being used to form the grid. The modulation is achieved by changing the intensity of the beam and/or blocking the beam with some periodicity. Such a grid data may include a number and it is contemplated that each of the grid lines may include a number, which identifies the grid line to the detector module 16 of the UAV 18.

Figure 2:
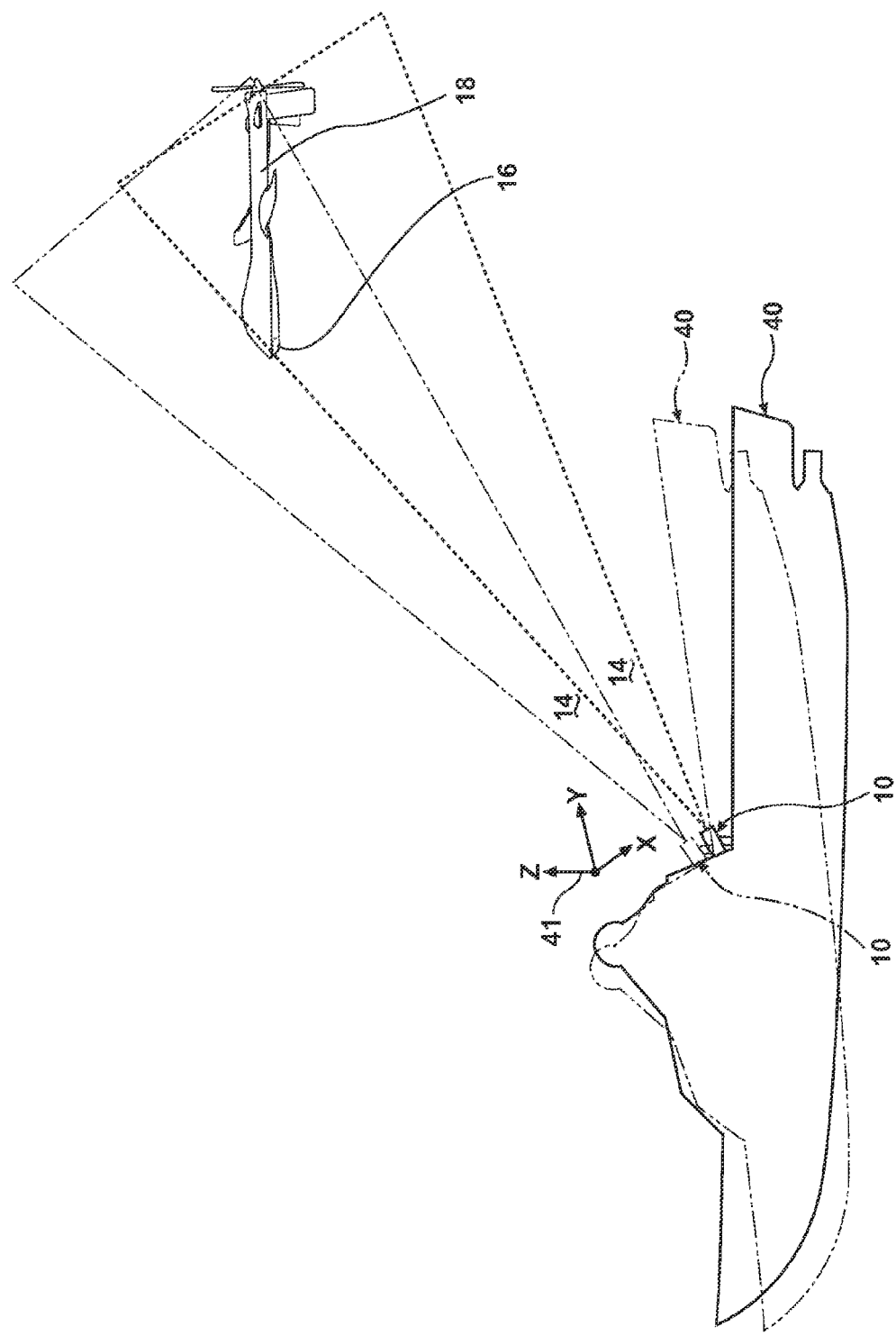
FIG. 2 is a schematic view of the grid generator of FIG. 1 mounted on a pitching ship and the UAV of FIG. 1.

It is contemplated that the grid generator 10 as described above may be located on a moving vehicle 40 as illustrated in FIG. 2. It is contemplated that the grid generator 10 may include a plurality of inertial sensors, which may by way of non-limiting examples include gyroscopes and accelerometers (not shown) for measuring angular and linear motion. The grid generator 10 may be located on or within any suitable moving vehicle 40 including a truck, boat, ship, or an aircraft. For exemplary purposes only, the grid generator 10 is illustrated as being located onboard a moving vehicle 40 in the form of a ship. The grid generator 10 may be thought of as defining a reference frame 41 and the grid generator 10 may repeatedly project into space within the field of transmission 14 a plurality of lines (not shown) defining a grid (not shown). In this manner, the grid projector may form repeated grid projections. As the vehicle 40 moves the grid generator 10 moves, the reference frame 41 defined by the grid generator 10 moves, and the repeated grid projections produced by the grid generator 10 also move.

By way of non-limiting example, the vehicle 40 is shown with movement in its pitch, which causes a change in pitch between a prior grid projection and a subsequent grid projection. The detector module 16 may see the grid movement and the UAV 18 may adjust its movement based on the grid movement. In this manner, landing the UAV 18 may be problematic as the UAV 18 may be trying to constantly align itself with the moving grid projection as the vehicle 40 and the grid generator 10 move.

Figure 3:
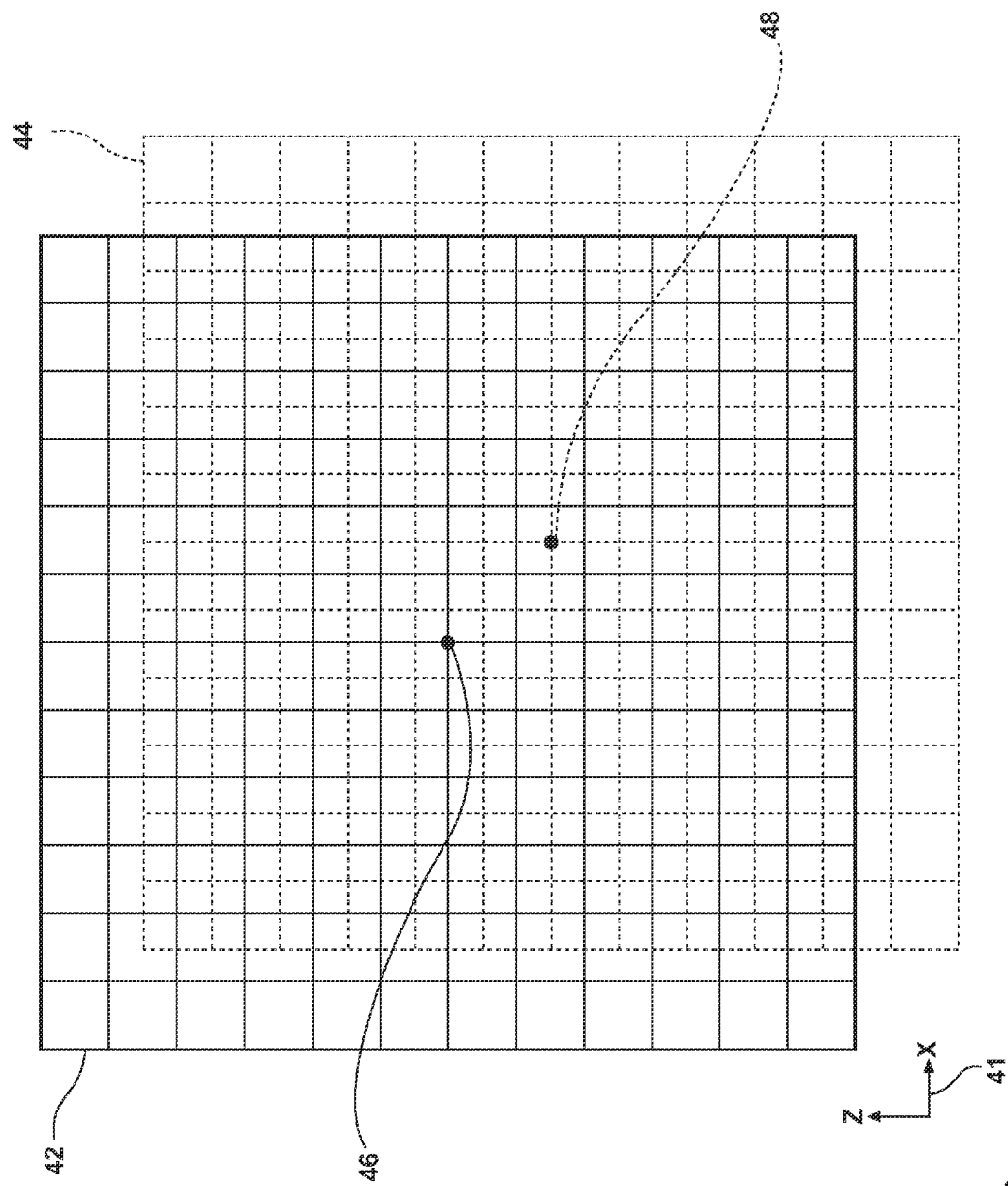
FIG. 3 is a schematic view of two grid projections that may be formed by the grid generator of FIG. 2.

By way non-limiting example, FIG. 3 illustrates a prior grid projection 42 and a subsequent grid projection 44 which may result from movement of the grid generator 10 when it is forming repeated grid projections. The subsequent grid projection 44 has a change in both pitch and yaw from the prior grid projection 42. Although not illustrated, it is contemplated that the vehicle 40 could move in any given direction, including rotation through pitch, yaw, and roll. For example, the vehicle 40 may roll causing a shift in both the horizontal and vertical lines of a subsequent grid projection. Alternatively, the vehicle 40 may move such that it moves in only a single direction.

As a complete grid may be projected multiple times a second, the grid, as detected by the detector module 16, and observed by the remote pilot, may appear to jump around or jitter, making it difficult for the UAV 18 to follow the grid. In reality, while the grid may appear jumpy, it typically will not have substantively moved. Therefore, there is a need to stabilize the grid to account for the movement of the grid generator 10 and provide a grid that appears relatively stable.

An embodiment of the invention includes a method of stabilizing a grid projected from such grid generator 10 to enable landing of a UAV 18 on, or in, the moving vehicle 40. The method generally includes the grid generator 10 repeatedly projecting into space a plurality of lines defining a grid, with the lines encoded with grid data configured to identify predetermined points on the grid. For example, in FIG. 3, the lines may be encoded with data that labels each of the vertical lines and horizontal lines and/or labels one or more points on the grid. It will be understood that all of the lines that are projected need not be encoded with data. For purposes of this description it may be understood that predetermined points on the prior grid projection 42 and the subsequent grid projection 44 may be encoded. Such predetermined points may thus be identified. Such predetermined points may be considered reference points about which the grid projections may be stabilized. By way of non-limiting example, a center 46 of the prior grid projection 42 and a center 48 of the subsequent grid projection 44 have been illustrated as predetermined reference points.

Between the prior grid projection 42 and the subsequent grid projection 44, an embodiment of the stabilization method includes determining a change in a reference frame 41 of the grid generator 10 relative to the prior grid projection 42. The approach tends to stabilize the grid spatially and not relative to the grid generator. This can be accomplished by altering the grid data in a subsequent grid projection such that grid data is relatively spatially fixed, even though the grid may be jittering. In other words, the grid data is spatially referenced and is not grid-referenced. The detector module 16 will use the grid data in providing a visual representation to the remote pilot. So, while the grid may be jittering, the grid appears relatively stable to the pilot.

Looking at the approach from the simple two-dimensional approach of FIG. 3, a spatial change in the location of the reference frame 41 defined by the grid generator 10 is determined. Such a spatial change is determined between the reference frame 41 when the prior grid projection 42 was projected and the reference frame 41 when the subsequent grid projection 44 was projected. Based on the determined spatial change, the grid data of the subsequent grid projection 44 is altered such that the subsequent grid projection 44 appears spatially stabilized relative to the prior grid projection 42. That is, the grid data of the subsequent grid projection 44 is modified such that the grid appears stabilized in space to the detector module 16 of the UAV 18.

Figure 4:
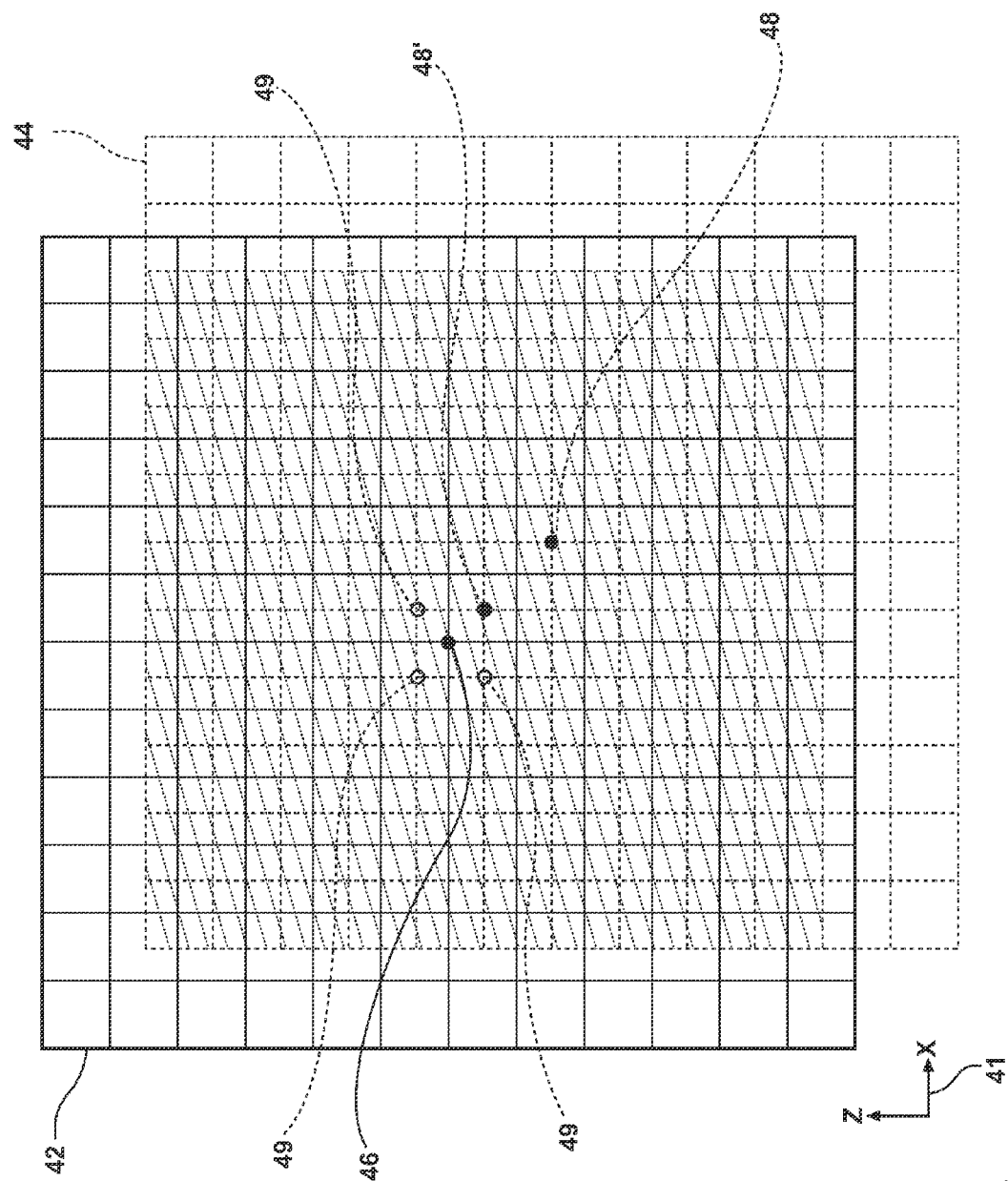
FIG. 4 is a schematic view of the two grid projections of FIG. 3.

To accomplish the stabilization in the two dimensional example of FIG. 3, the grid data of the subsequent grid projection 44 may be altered such that the encoded data indicates that the data is the same as the spatially closest grid point of the prior grid projection 42. In the illustrated example, the grid data of the subsequent grid projection 44 may be altered to indicate that the center of the grid 48 is actually spatially located where the center 46 is or as close to it as possible. For example, FIG. 4 shows that the center of the subsequent grid projection 44 may be encoded at 48' instead of at the point 48 because 48' is the closest point on the subsequent grid projection 44 to the center 46 of the prior grid projection 42. It should be noted that the center of the subsequent grid projection 44 may be encoded at any of the alternative points 49 because the points 49 are all equidistant with 48' to the center 46 of the prior grid projection 42. It is also contemplated that any other grid data encoded on the subsequent grid projection 44 may be altered to correspond to such a change. It is also contemplated that only the portion of the subsequent grid projection 44, which is within that of the prior grid projection 42 as illustrated by the cross-hatching may be encoded. Because the grid data has been altered, the grid that is visually provided to a remote pilot of a UAV will appear not to have moved as much as the grid has actually moved.

It is contemplated that the method of stabilizing the grid projection may include three-dimensional movement of the grid generator, which may be represented, by way of non-limiting example, determining angular changes in roll, pitch and yaw of the reference frame 41. In that case, altering the grid data may include converting the angular changes of roll, pitch, and yaw into grid line adjustments for the grid data of the subsequent grid projection. Alternatively, in the case where the grid includes a reference point as described above, determining a change in the reference frame 41 of the grid generator 10 relative to the prior grid projection may include determining a change in the reference frame 41 relative to the reference point.

Figure 5:
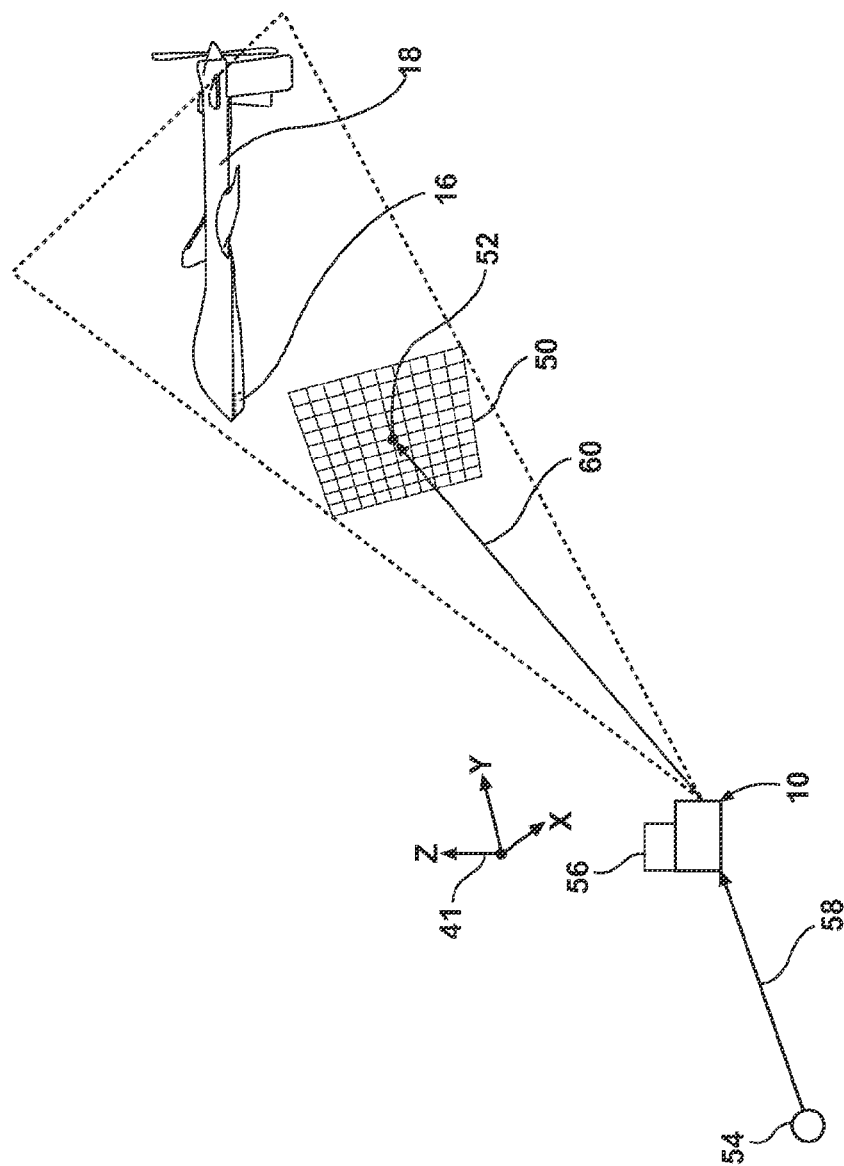
FIG. 5 is a schematic view of a center of gravity of a vehicle on which the grid projector of FIG. 1 is mounted as well a grid projected into space and the UAV of FIG. 1.

A vector-based determination may be used to determine the change in the reference frame 41 of the grid generator 10 relative to the prior grid projection. FIG. 5 illustrates a grid 50 having a reference point 52 as well as a center of gravity 54 of a vehicle (not shown) on which the grid generator 10 is mounted. The grid generator 10 is illustrated as being offset from the center of gravity 54 of the vehicle. The grid generator 10 is illustrated as including an inertial measurement unit (IMU) 56, which may include a plurality of inertial sensors including gyroscopes and accelerometers for measuring angular and linear motion. A vector 58 from the center of gravity 54 to the relative reference frame 41 for the grid generator 10 and a vector 60 from the reference frame 41 of the grid generator 10 to the reference point 52 are illustrated.

Figure 6:
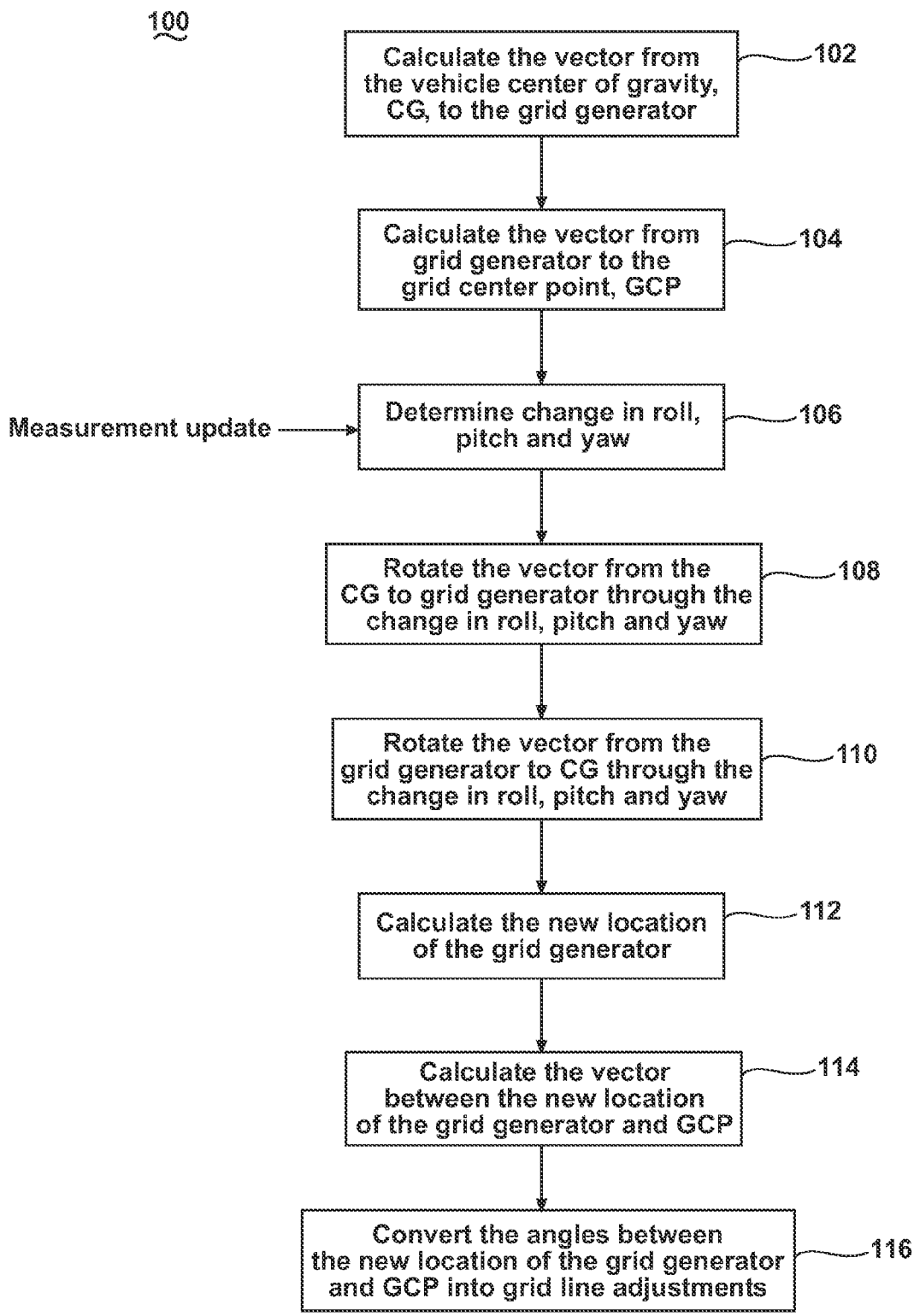
FIG. 6 is a flow chart of an embodiment of a method for stabilizing a projected grid.

FIG. 6 illustrates a method 100 for stabilizing a projected grid with a vector-based determination according to one embodiment of the invention. The vector-based determination assumes knowledge of the orientation of the grid generator 10 and the location of the grid generator 10 relative to the center of gravity 54 of the vehicle carrying the grid generator 10. The method 100 begins by calculating the vector from the vehicle center of gravity 54 to the reference frame 41 defined by the grid generator 10 at 102. At 104, the vector from the reference frame 41 defined by the grid generator 10 to the grid reference point 52 is calculated. At 106, a measurement update related to the roll, pitch, and yaw of the vehicle, which may be provided by the IMU, is taken into consideration and an angular change in roll, pitch, and yaw of the reference frame 41 may be determined.

At 108, the vector from the vehicle center of gravity 54 to the reference frame 41 defined by the grid generator 10 may be rotated through the roll, pitch and yaw. At 110, the vector from the reference frame 41 defined by the grid generator 10 to the grid reference point 52 may be rotated through the roll, pitch and yaw. At 112, a new position of the reference frame 41 of the grid generator 10 may be determined from the rotation of the vector. At 114, a vector may be calculated from the new position of the reference frame 41 of the grid generator 10 to the grid reference point 52. At 116, the angular changes in roll, pitch and yaw may be converted into grid line adjustments and the grid data of the subsequent grid projection may be altered appropriately. By way of non-limiting example, the grid lines of the subsequent grid projection may be renumbered or predetermined points on the subsequent grid projection may be relocated in accordance with the measured change. The method 100 results in the data encoded on the subsequent grid projection making it appear to the detector module 16 of the UAV 18 that the grid has not physically moved regardless of the movement of the grid generator 10.

It should be noted that the sequence depicted is for illustrative purposes only and is not meant to limit the method 100 in any way. It may be understood that the portions of the method may proceed in a different logical order, additional or intervening portions may be included, or described portions of the method may be divided into multiple portions, or described portions of the method may be omitted without detracting from the described method. By way of non-limiting example, it is also contemplated that a frequency of the change in the reference frame 41 may be determined and that the grid data may not be altered when the frequency of the change is higher than the pilot, autopilot, or vehicle can respond to, or lower such that the pilot, autopilot, or vehicle can normally and controllably respond to. By way of example, for many classes of aircraft, this would this range might be between 1 Hz and 5 Hz as these frequencies create a rate of jittering that a remote pilot or autopilot cannot sufficiently respond to when trying to use the grid for landing. Frequencies that are higher or lower are either not that noticeable to the remote pilot, or can be responded to by the remote pilot or autopilot.

Landing a UAV at an unimproved site may be especially difficult because of the lack of instrument landing aids, taxi and parking controllers, and departure guidance aids and control. It is contemplated that a suitable grid generator could be deployed, or even air-dropped, onto such an intended landing site. Depending on the orientation of the grid generator upon its landing, the grid projected from the grid generator may be improperly aligned. For example, it may be projected in the wrong orientation or in the wrong direction. This may result in problematic landings of the UAV. An embodiment of the invention includes a method of orienting a grid generator relative to the earth.

Figure 7:
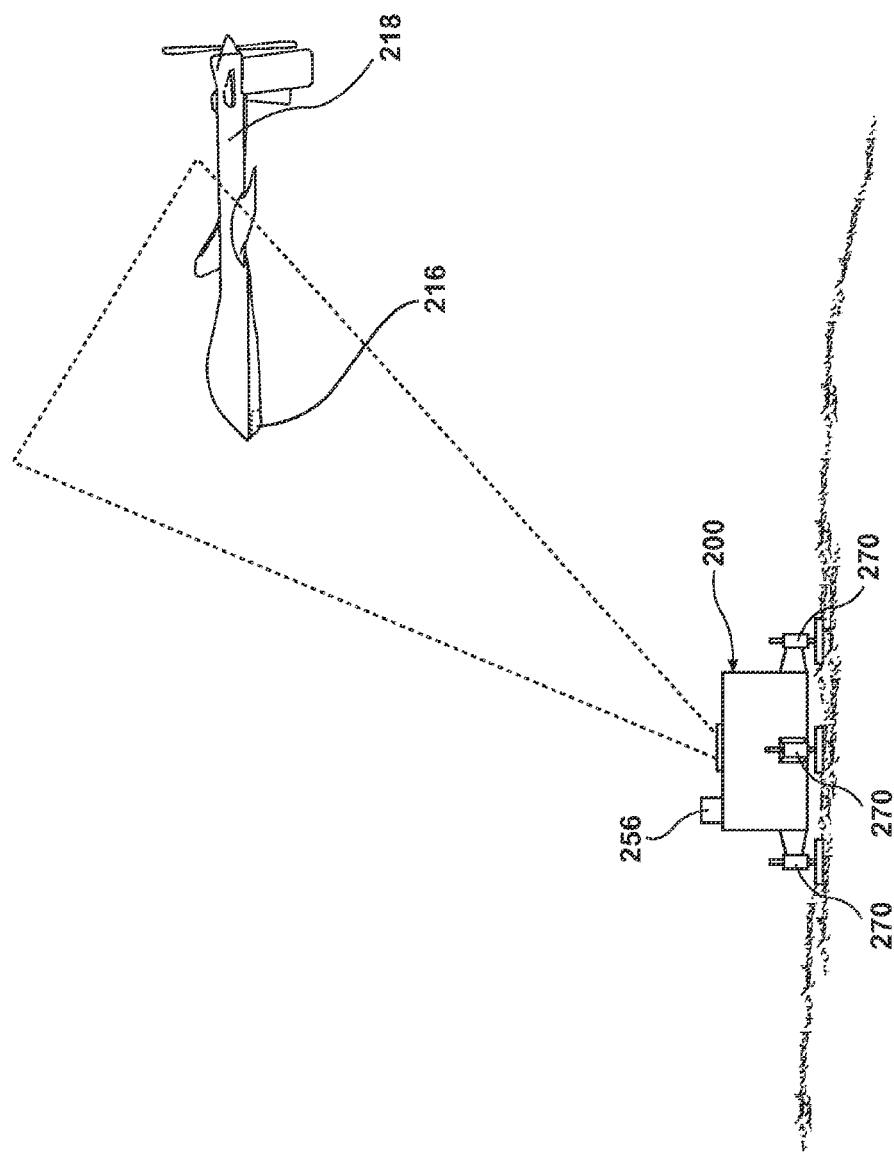
FIG. 7 is a side view of a grid generator that may be oriented according to yet another embodiment of the invention.

FIG. 7 illustrates a grid generator 200 capable of orienting itself relative to the earth according to a second embodiment of the invention. The grid generator 200 is similar to the grid generator 10; therefore, like parts will be identified with like numerals increased by 200, with it being understood that the description of the like parts of the grid generator 10 applies to the grid generator 200, unless otherwise noted. One difference between the two is that the grid generator 200 is illustrated as including leveling arms or lever arms 270. Any number of lever arms 270 may be included on the grid generator 200 to aid in leveling the grid generator 200. Although lever arms 270 have been illustrated and described it is contemplated that alternative mechanisms may be included to level the grid generator 200 relative to the earth.

Further, a gimbal or a turntable (not shown) may also be included in the grid generator 200 such that the grid generator 200 may be rotated and the heading or alignment of the grid generator 200 may be changed. An IMU 256, which may include a plurality of inertial sensors including gyroscopes and accelerometers, may also be included. As described above with respect to the earlier embodiments, the IMU 256 may measure angular and linear motion of the grid generator 200 as well as its orientation relative to earth through a process known as gyrocompassing. In the event that the grid generator 200 is moving at known velocities, this gyrocompassing process is called in-motion alignment.

A method of orienting the grid generator 200 relative to earth may include leveling the grid generator 200. Such leveling may include a coarse leveling and/or a fine leveling process. The leveling may include an approximate leveling, which may include at least horizontally leveling the grid generator 200 relative to the ground. By way of non-limiting example, the leveling may be done by obtaining measurements from the IMU 256 and adjusting the position of the grid generator 200 relative to the earth through movement of the lever arms 270, or analytically by means of IMU measurement processing. It is contemplated that such leveling of the grid generator 200 may be done in any suitable manner and the mechanism for such leveling is not germane to the invention.

The method of orienting the grid generator 200 may include determining a heading or azimuth of the grid generator 200 relative to a reference direction. For example, determining the heading of the grid generator 200 relative to the reference direction may include determining true north as the reference direction. By way of additional non-limiting example, determining the heading of the grid generator 200 relative to the reference direction may include determining an azimuth of the grid generator 200. In some implementations, it may be advantageous to rotate the projected grid to align with a predetermined heading or a predefined or optimal azimuth. The gimbal or turntable may be used to rotate the grid generator 200 and change the heading or alignment of the grid generator 200. In this way, when the plurality of lines defining the grid along a predetermined heading is projected by the grid generator 200 obstacles may be avoided, or favorable wind directions may be accommodated. Utilizing a heading-aligned and locally level grid generator that is oriented in this manner allows for a properly aligned grid to be projected from the grid generator.

The methods described above are for exemplary purposes only and are not meant to limit the inventive embodiments in any way as it is understood that the portions of the method may proceed in a different logical order, additional or intervening portions may be included, or described portions of the method may be divided into multiple portions, or described portions of the method may be omitted without detracting from the described method. For example, it is contemplated that with respect to either stabilizing the projected grid or orienting the grid generator that an initial self-test may be included to determine the overall health of the equipment by comparing measured outputs of the system with expected outputs (range limit tests, rate limits tests, etc.). It is also contemplated that a grid generator on a moving vehicle may benefit from orientation of the grid generator to remove the effects of oscillatory vibrations from the projected grid. Thus, before the grid projected from the grid generator is stabilized the grid generator may be oriented through lever arm corrections and motion compensation as described above.

The above described embodiments provide for a number of benefits. For example, the above described grid generators may be used on a landing site that is either stationary or non-stationary. Further, stabilizing the projected grid removes undesirable grid motion that would make the projected grid difficult for the UAV to track. Orienting the grid generator allows for landing a UAV on uncharted runways and landing areas, which otherwise may not be utilized.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of stabilizing a grid projected from a grid generator of a relative navigation system, with the grid generator defining a reference frame, the method comprising: repeatedly projecting into space from the grid generator a plurality of lines defining a grid, with the lines encoded with grid data configured to identify predetermined points on the grid; between a prior grid projection and a subsequent grid projection of the repeated grid projections, determining a change in a reference frame of the grid generator relative to the prior grid projection; and based on the determined change, altering the grid data of the subsequent grid projection such that the subsequent grid projection appears stabilized relative to the prior grid projection.

2. The method of claim 1 wherein the altering of the grid data comprises the grid data of the subsequent grid projection indicating that the data is the same as a spatially closest grid point of the prior grid projection.

3. The method of claim 1 wherein the determining the change comprises determining angular changes in roll, pitch, and yaw of the reference frame, and the altering the grid data comprises converting the angular changes of roll, pitch, and yaw into grid line adjustments.

4. The method of claim 1 wherein one of the points is a reference point about which the grid is stabilized.

5. The method of claim 4 wherein the reference point is a center of the grid.

6. The method of claim 4 wherein the determining a change comprises determining a change in the reference frame relative to the reference point.

7. The method of claim 6 wherein the determining the change comprises determining a vector from the reference frame to the reference point for the prior grid projection, determining angular changes in roll, pitch, and yaw of the reference frame, rotating the vector through the roll, pitch, and yaw, determining a new position of the reference frame from the rotation of the vector, determining a second vector from the new position of the reference frame to the reference point for the prior grid projection, and converting the angular changes in roll, pitch, and yaw into grid line adjustments.

8. The method of claim 7 wherein the determining the change further comprises determining a change between the reference frame and a center of gravity of an object on which the grid, generator is mounted.

9. The method of claim 8 wherein the determining the change between the reference frame and the center of gravity comprises determining a vector from the center of gravity to the reference frame for the prior projection, determining angular changes in roll, pitch, and yaw of the reference frame, rotating the vector through the roll, pitch, and yaw, determining a new position of the reference frame from the rotation of the vector, determining a second vector from the new position of the reference frame to the center of gravity for the prior projection, and converting, the angular changes in roll, pitch, and yaw into grid line adjustment.

10. The method of claim 1, further comprising determining a frequency of the change in the reference frame and altering the grid data when the frequency of the change is between 1 Hz and 5 Hz.

11. A method of orienting relative to earth a grid generator for a relative navigation system, the method comprising: leveling, the grid generator; determining a heading of the grid generator relative to a reference direction; and projecting from the grid generator a plurality of lines defining a grid along a predetermined heading.

12. The method of claim 11 wherein the leveling comprises conducting an approximate leveling.

13. The method of claim 12 wherein the leveling is at least horizontal leveling.

14. The method of claim 11 wherein the determining the heading of the grid generator relative to the reference direction comprises determining true north.

15. The method of claim 11 wherein the determining the heading of the grid generator relative to the reference direction comprises determining an azimuth of the grid generator.

* * * * *